Figure 1:
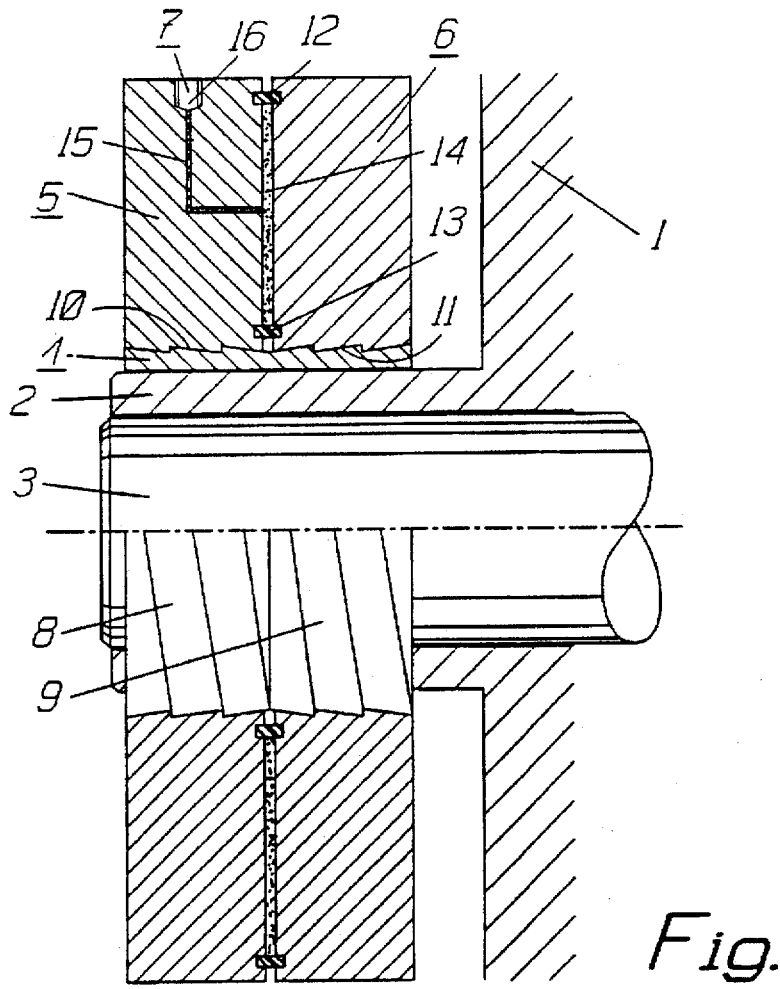

United States Patent [19]

Disborg

[11] Patent Number: 5,672,026

[45] Date of Patent: Sep. 30, 1997

[54] HYDRAULIC FRICTION CLAMP COUPLING FOR SHAFTS

[75] Inventor: Lennart Disborg, Linkoping, Sweden

[73] Assignee: ETP Transmission AB, Linkoping, Sweden

[21] Appl. No.: 564,042

[22] PCT Filed: Jun. 7, 1994

[86] PCT No.: PCT/SE94/00548

§ 371 Date: Dec. 12, 1995

§ 102(e) Date: Dec. 12, 1995

[87] PCT Pub. No.: WO95/00767

PCT Pub. Date: Jan. 5, 1995

[30] Foreign Application Priority Data

Jun. 17, 1993 [SE] Sweden ................... 9302105

[51] Int. Cl.$^6$ ........................................... F16D 1/09
[52] U.S. Cl. .................... 403/369; 403/365; 403/31
[58] Field of Search ....................... 403/365–371, 403/31

[56] References Cited

U.S. PATENT DOCUMENTS

| 3,596,943 | 8/1971 | Krauss . | |
|---|---|---|---|
| 4,364,687 | 12/1982 | Adell . | |
| 4,407,603 | 10/1983 | Lundgren | 403/370 |
| 4,425,050 | 1/1984 | Durand | 403/31 X |
| 4,824,277 | 4/1989 | Adolfsson | 403/370 |

FOREIGN PATENT DOCUMENTS

| 3401837 | 7/1985 | Germany | 403/370 |
|---|---|---|---|
| 3738138 | 1/1989 | Germany | 403/370 |
| 429 993 | 10/1983 | Sweden . | |
| 448 315 | 2/1987 | Sweden . | |

*Primary Examiner*—Anthony Knight
*Attorney, Agent, or Firm*—Larson and Taylor

[57] ABSTRACT

Hydraulically actuatable friction clamp coupling of the type which can be used for clamp connecting a sleeve (2) to a drive shaft (3). The clamp coupling includes a shape deformable inner ring (4) which is adapted to engage the sleeve (2), and which, at the outer surface thereof, is formed as a double, counter directed screw having two screw portions (8, 9) which meet substantially at the longitudinal center of the inner ring (4). The screw flange sides of the screw portions have the shape of saw tooth formed cone surfaces (10) as seen in an axial cross section. The outer rings (5, 6) which, at the inner race thereof, are formed with screw like cone surfaces (11) which are saw tooth shaped in a cross section view, match the cone surfaces (10) of the inner ring (4). The two outer rings (5, 6) form, in common, an intermediate, sealed pressure chamber (14) which is filled with a hydraulic pressure medium adapted to be pressurized from an internal or external source of pressure (7), whereby the outer rings (5, 6) are being pressed apart and the inner ring (4) is being compressed thereby clamping the hollow shaft (2) onto the drive shaft (3). Devices are provided for mechanically blocking the outer rings with full clamp action in their moved-apart conditions.

10 Claims, 3 Drawing Sheets

HYDRAULIC FRICTION CLAMP COUPLING FOR SHAFTS

The present invention generally relates to a friction clamp coupling of the type which can be used for clamp connection of a shape deformable sleeve or hollow shaft on a rotatable or axially displacable drive shaft. The invention is more particularly directed to such a friction coupling which comprises an inner ring which can change its shape and which is arranged to engage the sleeve or the hollow shaft and which, at the outer surface thereof, is formed with cone elements, at least one outer ring which, at the inner surface thereof, is formed with cone elements matching the cone elements of the inner ring and which is/are adapted to cooperate with said cone elements of the inner ring and which, upon an axial displacement of the outer ring in relation to the inner ring, makes said shape-deformable inner ring become compressed thereby being pressed against the sleeve or the hollow shaft and being clamped to the drive shaft or the hollow shaft.

Many embodiments of friction couplings of this type are known in the art. For instance the Swedish laid out publication 425,182 (Förenade Fabriksverken) discloses a simple cone coupling apparatus of the said type, in which the inner cone sleeve and the outer cone sleeve can be pulled or pressed to an axial mutual displacement and to a clamp connection on a drive shaft by a screw means.

The U.S. Pat. No. 3,596,943 (W F Krauss) discloses a similar cone coupling apparatus comprising three cooperating cone parts which are likewise displaced in the axial direction in relation to each other by a screw means for clamp connecting an active part thereof to a drive shaft.

A special type of coupling is known from the Swedish laid out publication 429,993 (SKF Nova AB), in which the cone elements are split into several part elements which, in common, provide a saw-tooth shaped profile, as seen in an axial cross section. Cone elements designed accordingly give an improved clamp action, a possibility of controlling the clamp force in different parts of the friction coupling, and they make it possible to market the friction coupling with the sleeves thereof as an assembled integral unit. According to said laid out publication the saw-tooth shaped cone profile can be formed as two counter-directed threads having thread entries from each end of the sleeve and in which the threads meet at the axial centre of the inner cone sleeve. The outer cone sleeve is split into two like outer rings having an internal thread profile matching the thread profice of the inner ring, and the outer rings can be screwed onto the inner ring so as to engage each other with their meeting end surfaces. The outer rings can be pressed apart by a suitable screw means.

All the above mentioned friction clamp couplings of the known type are operated by some type of screw means. Normally large forces are needed for safely clamp connecting a machine part on a drive shaft by means of said cone coupling elements, and therefore it is generally necessary to use powerful screw means, and generally it is also necessary to use several screw means distributed round the coupling for providing the mutual displacement of the inner ring and the outer ring or rings. It may also be necessary to make use of inconveniently strong forces for tightening of the screws. It may also be difficult to calculate the tightening force, and thereby also the clamp force, so that said force is exactly the same for all tightening screws which are distributed round the coupling.

An attempt to solve the problem of obtaining a strong and equally distributed tightening force is illustrated in the Swedish laid out publication 448,315 (F Durand). In said publication a hydraulical pressure medium is used for providing the clamp action. In this case the inner ring is formed as two separate cone rings having the pointed cone ends facing each other, and there is also used two outer rings arranged so that they can be pressed apart actuated by the hydraulic medium. For making it possible to mount the two outer rings on the inner ring it is, however, necessary that the cone rings of said inner ring, named pressure rings, are formed separated from each other, so that they can be interconnected inside the two outer rings after said outer rings have been moved together.

The object of the invention therefore is to solve the problem of providing a friction clamp coupling of the initially mentioned type comprising an inner ring having an even, generally circular, inner surface and an outer surface having a saw-tooth shaped, double and oppositely directed thread profile, and two outer clamp rings, and in which the tightening of the coupling, which is made by moving the outer rings apart, is made by a power transmitted by a hydraulic pressure medium, whereby said power is exactly equally distributed round the entire coupling, and is made with a clamp force which can be varied as desired from a relatively strong to a very strong clamp force, and in which the tightening can be made quickly and simply by means of an external source of pressure, and in which the releasing of the clamp force can be made like simply and easily.

Thus, according to the invention the inner ring is of the double, oppositely facing screw type, and the two co-operating outer rings are formed with an intermediate, sealed pressure chamber which can be filled with a hydraulic pressure medium, which pressure medium can be pressurized from an internal or external source of pressure.

Between the co-operating outer rings there may preferably also be a mechanical means for mechanically blocking said outer rings in their moved-apart condition. Such a mechanical means may be ring shaped, in particular semi-annular, segments which can be introduced in the area between the moved-apart outer rings, or it may be screw means which are threaded through one of the outer rings and which block the outer rings in their moved-apart condition when said screw means is/are tightened.

Further characteristics and advantages of the invention will be evident from the following detailed description, in which reference will be made to the accompanying drawings.

In the drawings

FIG. 1 shows a first embodiment of a friction clamp coupling according to the invention, mainly in an axial cross section view, which embodiment is suited for clamp connecting a hollow shaft to a drive shaft.

Figure 2:
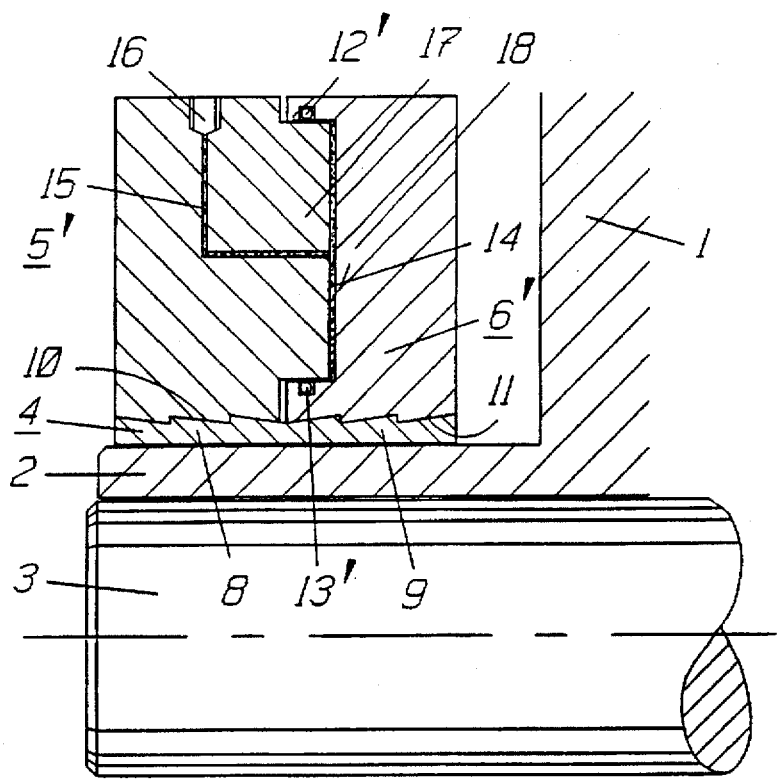
Figure 3:
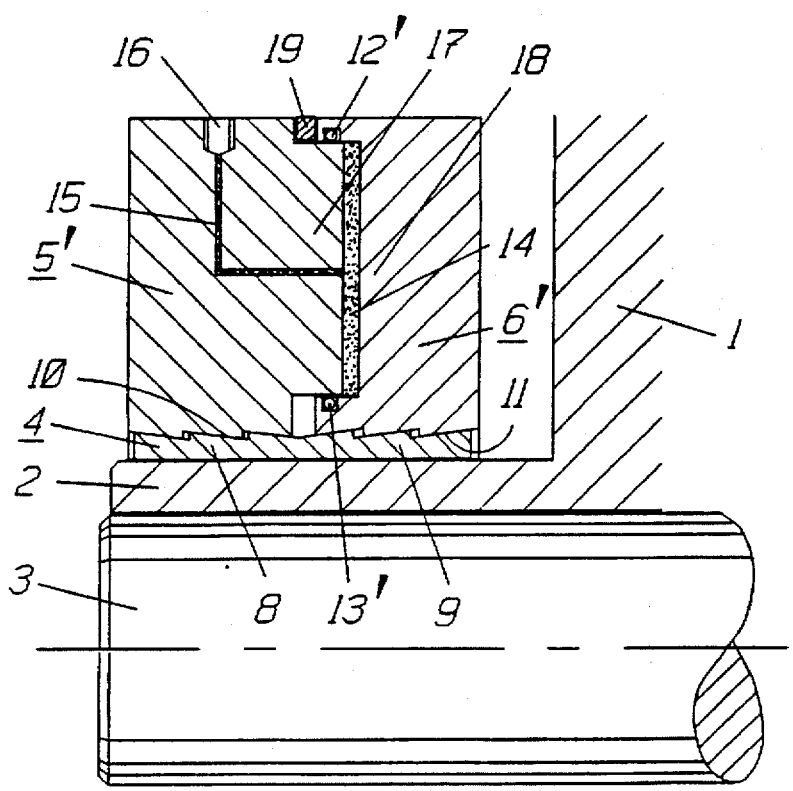

FIG. 2 correspondingly shows a partial axial cross section view of an alternative clamp coupling before the hollow shaft is clamped to the drive shaft, and FIG. 3 shows the same clamp coupling after it, has been pressurized and clamp connected to the drive shaft.

Figure 4:
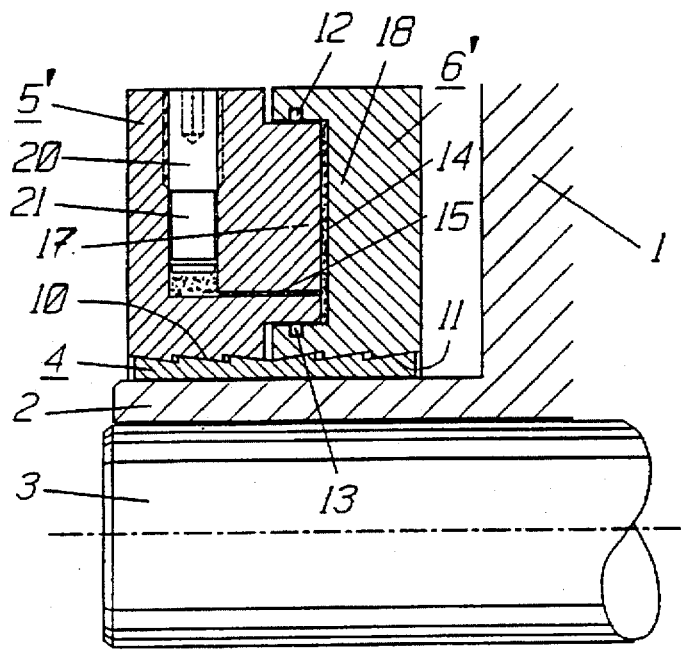
Figure 5:
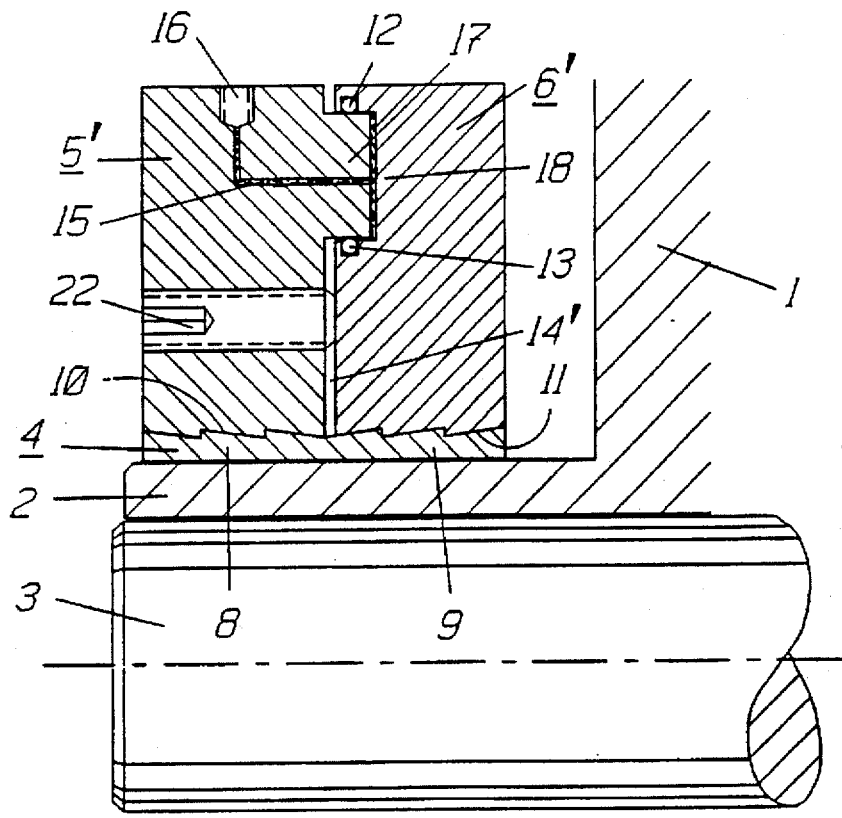
Figure 6:
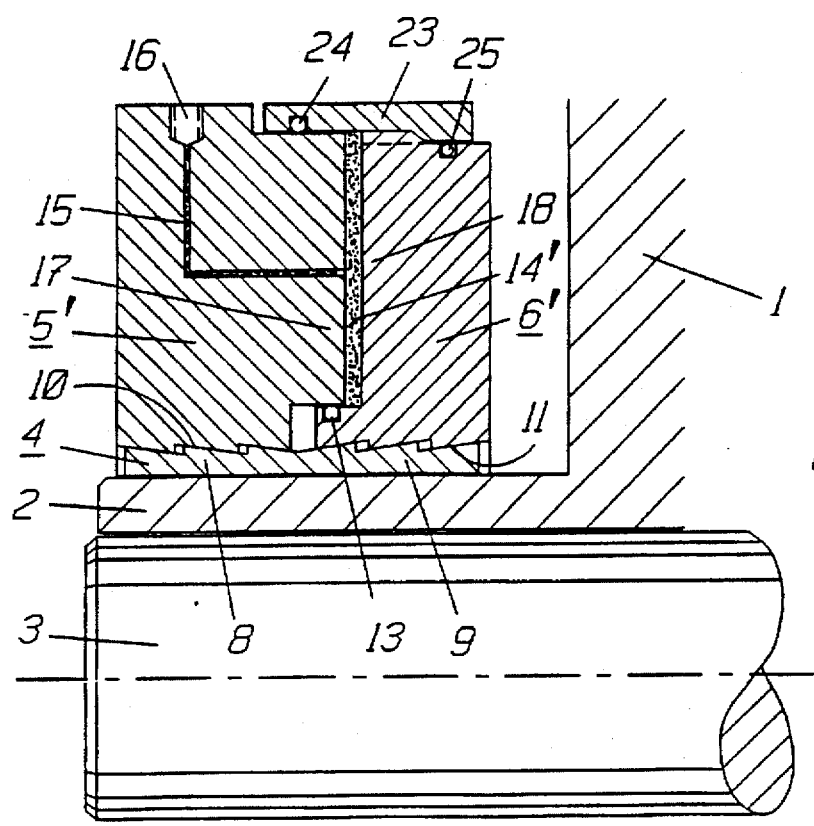

FIG. 4, 5 and 6 show, in like views, three further alternative friction clamp couplings according to the invention.

A friction clamp coupling according to the invention can be used for clamp connecting various types of objects, and it is very useful for clamp connecting e.g. a hollow shaft to a drive shaft. The drawings illustrate this type of application of the invention.

Thus, FIG. 1 shows a friction clamp coupling for clamp connecting a hollow shaft 2 extending from a hub 1 to a drive shaft 3 which can be a rotating shaft, an axially displacable shaft or any other type of shaft.

The friction clamp coupling generally comprises an inner clamp ring 4 co-operating with two outer rings 5 and 6 which can be moved-apart by a hydraulically actuatable means 7.

The inner clamp ring 4 has a cylindrical inner race which is matching the outer dimension of the hollow shaft 2. Exteriorly the inner clamp ring 4 is, as known in the art, formed as a double screw having two screw portions 8 and 9 each having its entry from the end of the inner sleeve 4 and meeting at or close to the longitudnal centre of the inner sleeve 4. The screw portions 8 and 9 are formed with smooth flank thread sides providing cone surfaces 10 over which the inner ring 4 can be clamped to the hollow shaft 2. The screw portions or threads 8, 9 with their cone surfaces 10 provide two profiles which are saw tooth shaped in an axial cross section. The tapering cone surfaces are facing each other. The flank thread sides or the cone surfaces 10 preferably should have a cone angle which is greater than the friction angle. Said angle makes the outer rings 5 and 6, when being axially moved-apart, press the inner ring 4 against the hollow shaft 2, and said hollow shaft 2, in turn, is thereby pressed against the drive shaft 3, thereby creating a solid interconnection between the hollow shaft 2, also including the hub 1, and the drive shaft 3.

The inner ring 4 can be axially slotted on one or more places, but in case there are relatively narrow tolerances between the inner ring and the hollow shaft there is no need that the inner ring is slotted, since it is still possible to compress said inner ring strongly enough as to provide a safe clamping of the hollow shaft onto the drive shaft. Similarly the hollow shaft 2 can be axially slotted or non-slotted.

Also, or alternatively the hollow shaft can be slotted in the axial direction, and the slot thereby have substantially the same length as the the inner ring.

It is further possible to form the inner ring from several inner ring parts, which can be interconnected by a plastic mounting ring so that the multi-piece inner ring appears as an integral unit.

The outer rings are structurally substantially mirror symmetrical with reference to the end surfaces thereof facing each other, and they are, along the inner surfaces thereof, formed with an inner screw part 11 corresponding to the screws 8, 9 of the inner ring 4. The outer rings 5, 6 can be screwed onto the inner ring 4 from each end thereof, and they are, in their initial positions, preferably tightened so that the end surfaces thereof engage each other.

There are at least two sealing rings 12 and 13 between the two outer rings, which sealing rings define an annular chamber 14 therebetween which is to be filled with a hydraulic pressure medium of a type which is known per se. Via a channel 15, which is filled with a pressure medium, the chamber 14 communicates with a nipple 16 or a similar means for pressurizing the pressure medium. The nipple may be formed for being connected to an external source of pressure like an external pressure pump, or it can be a screw having a pressure piston, as shown in FIG. 4, for internal pressurization of the pressure medium in the channel 15 and in the pressure chamber 14 between the outer rings 5 and 6.

The pressure chamber 14 and the sealings between the outer rings can be formed in many various ways, for instance as shown in FIGS. 2 and 3, in which one of the outer rings 5' is formed as a piston part 17 and the other outer ring 6' is formed as a cylinder part 18, and in which the sealings 12' and 13' are formed as O-ring sealings on the piston-cylinder surfaces. FIG. 2 shows the coupling in a non-connected, or not solidly interconnected condition, and FIG. 3 shows the same coupling in a condition fixedly pressed to the drive shaft 1. It is possible to exclude the inner sealing 13' and to allow the hydraulic pressure medium to become partly pressed into the area between the cone surfaces 10 and 11 of the outer rings and the inner ring so as to lubricate same thereby facilitating the displacement of the outer rings on the inner ring. A slight leakage of hydraulic fluid during the pressurizing step is acceptable.

In order to block the outer rings 5' and 6' in their moved-apart positions it is possible to introduce e.g. semi-annularly formed locking segments 19 between the rings 5' and 6', as shown in FIG. 3. After this is done the pressure of the pressure chamber 14 can be released without causing any problems.

FIG. 4 shows a clamp coupling which is basically of the same type as that of FIGS. 2 and 3 but in which the external pressure pump is substituted by a pressure screw 20 which is threaded into the outer ring 5' and which is arranged to actuate a pressure piston 21 for pressurization of the hydraulic pressure fluid.

FIG. 5 shows a method of blocking the outer rings in their mounted and moved-apart conditions. In this case the blocking is made by means of several blocking screws 22 which are threaded axially through one of the outer rings 5'. The object of the blocking screws only is to keep the outer rings safely in their already moved-apart conditions. The screws 22, on the contrary, are not dimensioned for being capable of moving said rings apart.

FIG. 6 shows an alternative possibility of blocking the outer rings 5' and 6' in their moved-apart conditions. This is done by means of a blocking ring 23 which is threaded on one of the outer rings 6', and which by means of sealings 24, 25 define the pressure medium chamber 14'. By rotating the blocking ring 23 on its threads it comes to engagement with the other outer ring 5', and the outer rings are accordingly kept in their moved-apart conditions.

There is a further possibility of securing the outer rings 5 and 6 in their moved-apart conditions, namely by rotating the rings on their threads while the rings are moved-apart, so that said rings, with unchanged clamp force, comes into butt contact with each other. Said rotation of the rings has to be made at the same time as the hydralic fluid presses the rings apart.

| Reference numerals | | | |
|---|---|---|---|
| 1 | hub | 14 | pressure chamber |
| 2 | hollow shaft | 15 | passageway |
| 3 | drive shaft | 16 | pressure nipple |
| 4 | inner clamp ring | 17 | piston part |
| 5 | outer ring | 18 | cylinder part |
| 6 | outer ring | 19 | blocking segment |
| 7 | hydraulic system | 20 | pressure screw |
| 8 | screw part (of 4) | 21 | pressure piston |
| 9 | screw part (of 4) | 22 | blocking screw |
| 10 | cone surface (of 5, 6) | 23 | blocking ring |
| 11 | screw part (of 5, 6) | 24 | sealing |
| 12 | sealing ring | 25 | sealing |
| 13 | sealing ring | | |

I claim:

1. Hydraulically actuatable friction clamp coupling which is used for clamp connecting a shape deformable sleeve to a displaceable drive shaft comprising:

a shape deformable inner ring which is adapted to engage the sleeve radially relative to a longitudinal axis of the drive shaft, said inner ring being a single piece and including a radially outer surface divided into first and second cone surfaces which face one another, said first and second cone surfaces when viewed in axial cross section each including several cone elements such that each of said first and second cone surfaces has a saw-toothed shape in axial cross section;

first and second outer rings mounted on said inner ring, said first and second outer rings having respective inner races provided with respective third and fourth cone surfaces which face one another, said third and fourth cone surfaces when viewed in axial cross section each including several cone elements such that each of said third and fourth cone surfaces has a saw-toothed shape in axial cross section which match respectively with the saw-tooth shapes of said first and second cone surfaces, and said first and second outer rings together forming an intermediate, sealed pressure chamber which is filled with a hydraulic pressure medium; and a pressurizing means for pressurizing the pressure medium in said pressure chamber to press said outer rings longitudinally apart, such that said third and fourth cone surfaces press inwardly against the matching and cooperating said first and second cone surfaces to cause said inner ring to compress and in turn to compress the deformable sleeve into frictional engagement with the drive shaft.

2. Friction clamp coupling according to claim 1 and further including a mechanical blocking means for mechanically blocking the first and second outer rings in a moved-apart positions.

3. Friction clamp coupling according to claim 2, wherein the mechanical blocking means is an annular segment introduced between the moved-apart said first and second outer rings.

4. Friction clamp coupling as claimed in claim 3, wherein said annular segment is formed of two semi-annular elements.

5. Friction clamp coupling according to claim 2, wherein the mechanical blocking means is one or more screws which are threaded through one of the outer rings and which, when being tightened, are brought to engage the other one of the outer rings thereby blocking said first and second outer rings in the moved-apart positions.

6. Friction clamp coupling according to claim 2, wherein the mechanical blocking means is a locking ring which is threaded onto an outer periphery of one of the outer rings thereby blocking said first and second outer rings in the moved-apart positions.

7. Friction clamp coupling according to claim 2, wherein said first and second cone surfaces are formed on said outer surface of said inner ring as respective screw portions directed counter to one another which meet substantially at a longitudinal center of said inner ring; and wherein the mechanical blocking means is formed by the rotation of one of the outer rings in relation to the inner ring so that the one of the outer rings engages the other outer ring at end surfaces facing each other when said inner ring is fully compressed.

8. Friction clamp coupling according to claim 1, wherein the inner ring is formed with a through slot.

9. Friction clamp coupling according to claim 1, wherein the inner ring and the sleeve are formed with an axial slot, the slot of the sleeve being of substantially the same length as that of the inner ring.

10. Friction clamp coupling as claimed in claim 1, wherein said first and second cone surfaces are formed on said outer surface of said inner ring as respective screw portions directed counter to one another which meet substantially at a longitudinal center of said inner ring.

* * * * *